(No Model.)

R. H. BUTLER, W. C. MOUNT, & J. W. ALEXANDER.
CAM FOR STAMP MILLS.

No. 276,350. Patented Apr. 24, 1883.

WITNESSES:
C. Neveux
C. Sedgwick

INVENTOR:
R. H. Butler
J. W. Alexander
W. C. Mount
BY
Munn & Co
ATTORNEYS.

UNITED STATES PATENT OFFICE.

REES H. BUTLER AND WILLIAM C. MOUNT, OF GAINESVILLE, AND JOHN W. ALEXANDER, OF ATLANTA, GEORGIA.

CAM FOR STAMP-MILLS.

SPECIFICATION forming part of Letters Patent No. 276,350, dated April 24, 1883.

Application filed January 20, 1883. (No model.)

*To all whom it may concern:*

Be it known that we, REES H. BUTLER and WILLIAM C. MOUNT, of Gainesville, Hall county, Georgia, and JOHN W. ALEXANDER, of Atlanta, Fulton county, Georgia, have invented a new and Improved Cam for Stamp-Mills, of which the following is a full, clear, and exact description.

Our improvements relate to cams for operating gold and silver stamping mills; and the invention consists in a certain construction of a clamp-cam, having the object to allow of the ready disconnection of any cam from the shaft in case it should become broken or worn out, and the placing of a new cam without the necessity of taking down the shaft or removing any of the other cams therefrom, as hereinafter described and claimed.

Reference is to be had to the accompanying drawings, forming a part of this specification, in which similar letters of reference indicate corresponding parts in both the figures.

Figure 1:
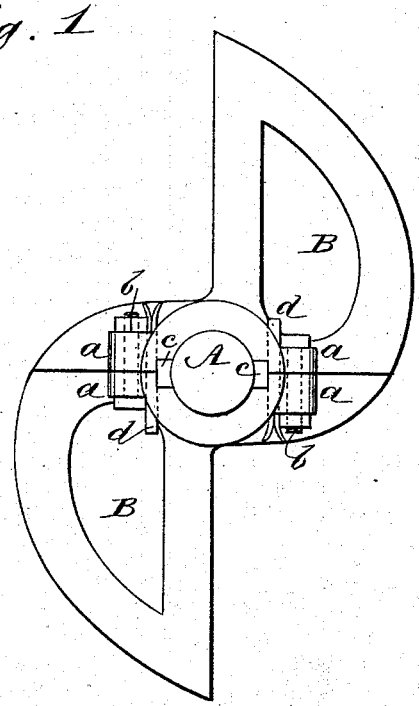
Figure 2:
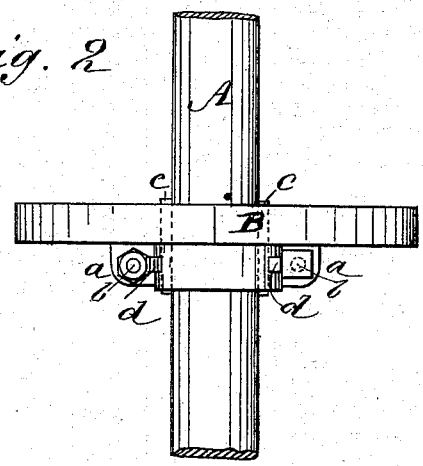

Figure 1 is a side view, and Fig. 2 a plan view, of our improved cam.

A represents the cam-shaft of a stamp-mill. The cam is made in two parts, B B, of similar form, each part being formed with one-half of the hub, so that when connected together upon the shaft they form a complete cam. The hub of each portion is formed with lugs $a$ $a$, that receive bolts $b$, by which the two parts of the cam are securely attached together after being placed upon the shaft. The cam is secured to the shaft by keys $c$, one-half of each keyway being formed in each portion of the hub, so as to receive the key, and the key is milled out to fit the circle of the shaft on which the cam is secured. Cross-keys $d$ are also driven through keyways formed at the base of the lugs $a$, to prevent the bolts $b$ and nuts thereon from turning after they have been screwed up. These keys $d$ are split, and they are to be spread with a suitable tool after being put in place. Two key-slots are shown. The object of the two slots is to allow of the application of the cams on mills that have been fitted for solid cams, and have a keyway running the length of the shaft on a straight line. In that case, if one slot in the clamp-cam should come opposite the slot in the shaft, the other slot would be at the blank side of the shaft, and in that case a blind key would be required at that side.

We are aware that cams have heretofore been made in two parts, and therefore do not claim such invention.

Having thus described our invention, we claim as new and desire to secure by Letters Patent—

The cam portions B B, formed with half-hubs, having one-half of the keyways formed in each half-hub, and provided with the lugs $a$, in combination with the bolts $b$ and keys $a$, substantially as herein shown and described.

REES H. BUTLER.
WILLIAM C. MOUNT.
JOHN W. ALEXANDER.

Witnesses as to Rees H. Butler and William C. Mount:
FLETCHER M. JOHNSON,
LESTER D. PUCKETT.

Witnesses as to Jno. W. Alexander:
L. J. GLENN, Jr.,
W. F. CRUSSELLE.